United States Patent [19]
Hammond et al.

[11] Patent Number: 6,041,417
[45] Date of Patent: Mar. 21, 2000

[54] METHOD AND APPARATUS FOR SYNCHRONIZING DATA RECEIVED IN AN ACCELERATED GRAPHICS PORT OF A GRAPHICS MEMORY SYSTEM

[75] Inventors: Maynard D. Hammond, Lawrenceville, Ga.; James M. Dewey, Ft. Collins, Colo.

[73] Assignee: Hewlett-Packard Company, Palo Alto, Calif.

[21] Appl. No.: 09/090,440

[22] Filed: Jun. 4, 1998

[51] Int. Cl.[7] ................................................. G06F 1/12
[52] U.S. Cl. ......................... 713/400; 714/731; 375/362
[58] Field of Search .................................. 713/400, 401, 713/500, 502, 503, 600, 601; 345/213; 375/353, 354, 355, 356, 357, 362; 365/189.05, 230.03, 233.5; 395/725, 550; 710/61; 714/707, 731, 744, 775, 789; 371/36

[56] References Cited

U.S. PATENT DOCUMENTS

| | | | |
|---|---|---|---|
| 5,142,683 | 8/1992 | Burkhardt, Jr. et al. | 395/725 |
| 5,377,205 | 12/1994 | Shi | 371/36 |
| 5,384,735 | 1/1995 | Park et al. | 365/189.05 |
| 5,666,321 | 9/1997 | Schaefer | 365/233.5 |
| 5,729,719 | 3/1998 | Gates | 395/550 |
| 5,831,924 | 11/1998 | Nitta et al. | 365/230.03 |
| 5,870,591 | 2/1999 | Sawada | 713/500 |

*Primary Examiner*—Joseph E. Palys
*Assistant Examiner*—Rijue Mai

[57] ABSTRACT

The present invention provides a method and apparatus for receiving and synchronizing data transmitted to a host interface unit of a graphics memory system on the rising and falling edges of a strobe signal in accordance with an accelerated graphics port (AGP) specification. An inner loop synchronization component, which is comprised in the host interface unit of the graphics memory system, receives data transmitted to the host interface unit on the falling and rising edges of a strobe signal and synchronizes the data to a PCI clock signal. The inner loop synchronization component comprises a first data transfer unit, a second data transfer unit and a control unit. The first data transfer unit comprises logic configured to capture the data transmitted on the falling edge of the strobe signal and to delay the captured data a predetermined number of cycles of the PCI clock before outputting the captured data from the first data transfer unit. The control unit detects the falling edge of the strobe signal and generates one or more timing signals based on the strobe signal. The rising edge of the strobe signal may or may not occur within the PCI clock cycle in which the falling edge of the strobe signal occurs. The second data transfer unit receives the timing signals generated by the control unit and utilizes the timing signals to capture the data transmitted on the rising edge of the strobe signal. The second data transfer unit then delays the captured data a predetermined number of cycles of the PCI clock before outputting the captured data from the second data transfer unit. The timing signals generated by the control unit are utilized by the second data transfer unit to ensure that the data transmitted on the rising edge of the strobe signal is output from the second data transfer unit in the same cycle of the PCI clock in which the data transmitted on the falling edge of the strobe signal is output from the first transfer unit.

23 Claims, 7 Drawing Sheets

METHOD AND APPARATUS FOR SYNCHRONIZING DATA RECEIVED IN AN ACCELERATED GRAPHICS PORT OF A GRAPHICS MEMORY SYSTEM

TECHNICAL FIELD OF THE INVENTION

The present invention relates to an accelerated graphics port and, more particularly, to a method and apparatus for synchronizing data received in an accelerated graphics port of a graphics memory system.

BACKGROUND OF THE INVENTION

Accelerated graphics port, commonly referred to as AGP, is a bus specification that was developed by Intel Corporation to provide graphics devices with faster access to main memory than the access speeds provided by the well-known peripheral control interconnect (PCI) bus specification, which was also developed by Intel Corporation. The PCI bus enables peripheral devices, such as, for example, keyboards, mice, printers and monitors to be connected to a central processing unit (CPU) and to operate a synchronously.

In computer graphics display systems, the need to provide the graphics device with direct access to the system main memory is especially important because graphics processing overhead, which is always a primary concern, can be reduced by providing the graphics device with direct access to the main memory. In these types of systems, the graphics device often is the only peripheral that is interconnected with the system CPU and with main memory. Therefore, there is often no need for a bus interface, such as the PCI interface, that is capable of communicating with several different types of peripherals. While the ability to communicate with several different types of peripherals provides obvious advantages, a direct, point-to-point connection between the main memory and a peripheral, such as a graphics device, provides faster access to the main memory because no intermediate processing is required to be performed by the bus interface to format the data for the particular peripheral that is accessing the main memory. AGP was developed in response to this need for a point-to-point interface between a graphics device and main memory that would allow faster access to main memory by the graphics device.

PCI typically operates at frequencies ranging from 33 MHz to 66 MHz with data transmitted on the rising edge of PCI clock. In an AGP system, data is transmitted on the rising and falling edges of a strobe. The strobe operates at frequencies ranging from 33 MHz to 66 MHz, resulting in a doubling of the data rate of a AGP interface system compared to a PCI system. In accordance with the AGP interface specification, the falling edge of strobe occurs in a known AGP clock cycle while the rising edge could occur in the same clock cycle as the rising edge or the subsequent cycle. This timing relationship complicates the task of synchronizing the received data with the AGP interface clock.

Currently, no satisfactory solution to this AGP synchronization problem has been developed. Accordingly, a need exists for a method and apparatus for synchronizing data received in an AGP interface.

SUMMARY OF THE INVENTION

The present invention provides a method and apparatus for receiving and synchronizing data transmitted to a host interface unit of a graphics memory system on the rising and falling edges of a strobe signal in accordance with an accelerated graphics port (AGP) specification. The apparatus of the present invention comprises an inner loop synchronization component which is comprised in the host interface unit of the graphics memory system. The inner loop synchronization component receives data transmitted to the inner loop synchronization component on the falling and rising edges of a strobe signal and synchronizes the data to a PCI clock signal.

The inner loop synchronization component comprises a first data transfer unit, a second data transfer unit and a control unit. The first data transfer unit comprises logic configured to capture the data transmitted on the falling edge of the strobe signal and to delay the captured data a predetermined number of cycles of the PCI clock before outputting the captured data from the first data transfer unit. The control unit detects the falling edge of the strobe signal and generates a timing signal that is derived from the strobe signal. The second data transfer unit comprises logic configured to capture the data transmitted on the rising edge of the strobe signal. The second data transfer unit receives the timing signal generated by the control unit and utilizes the timing signal to capture the data transmitted on the rising edge of the strobe signal.

The second data transfer unit comprises logic configured to capture the data transmitted on the rising edge of the strobe signal and to delay the captured data a predetermined number of cycles of the clock before outputting the captured data from the second data transfer unit. The rising edge of the strobe signal may or may not occur within the PCI clock cycle in which the falling edge of the strobe signal occurs. The second data transfer unit comprises logic for detecting the rising edge of the strobe signal and capturing the data transmitted on the rising edge. The second data transfer unit also comprises logic for delaying the captured data a predetermined number of cycles of the PCI clock before outputting the captured data from the second data transfer unit. The timing signals generated by the control unit are utilized by the second data transfer unit to ensure that the data transmitted on the rising edge of the strobe signal is output from the second data transfer unit in the same cycle of the PCI clock in which the data transmitted on the falling edge of the strobe signal is output from the first transfer unit. Thus, the data output from the first and second data transfer unit is available for transmission to other parts of the graphics memory system using the PCI clock in accordance with the PCI specification.

In accordance with the preferred embodiment of the present invention, the logic comprised by the first data transfer unit, hereinafter referred to as the A-bit transfer unit, includes a plurality of registers which make up a pipe stage for delaying a first bit of data, bit A, transmitted to the inner loop synchronization unit on the falling edge of the strobe signal. The falling edge of the strobe signal causes bit A to be latched into a first register. Bit A is then propagated through two other registers during the next two PCI clock cycles and output from the A-bit data transfer unit. Therefore, bit A is output from the A-bit data transfer unit two PCI clock cycles after it was presented to the A-bit data transfer unit.

The second data transfer unit, hereinafter referred to as the B-bit data transfer unit, preferably utilizes three registers for capturing the bit transmitted on the rising edge of the strobe signal. The bit transmitted on the rising edge of the strobe signal, bit B, is more difficult to capture than bit A because it is not known whether the rising edge of the strobe signal will occur in the same PCI clock cycle in which the falling edge of the strobe signal occurred, or whether it will occur in the next PCI clock cycle. Therefore, three registers are used to buffer bit B and then the timing signals generated by the control unit are utilized to control the propagation of bit B through the B-bit data transfer unit. In accordance with the preferred embodiment, the control unit comprises a counter/shift register which generates enable signals when the when the falling edge of the strobe occurs. These enable signals cause only one of the three registers to be enabled at any one time. When the rising edge of the strobe signal occurs, bit B is loaded into the enabled register.

The control unit also comprises logic which utilizes the enable signals generated by the counter/shift register to generate select signals. The select signals are input to a multiplexer which causes one of the three registers to be selected at a time. The selected register is unloaded and the B bit stored therein is loaded into an output register. The B bit is unloaded from the output register on the rising edge of the PCI clock signal. Regardless of whether the rising edge of the strobe signal occurs in the same PCI clock cycle in which the falling edge occurred or in the next PCI clock cycle, bit B will be presented at the output of the B-bit data transfer unit in the same PCI clock cycle in which bit A is presented at the output of the A-bit data transfer unit.

These and other features and advantages of the present invention will become apparent from the following discussion, drawings and claims.

DETAILED DESCRIPTION OF THE INVENTION

Figure 1:
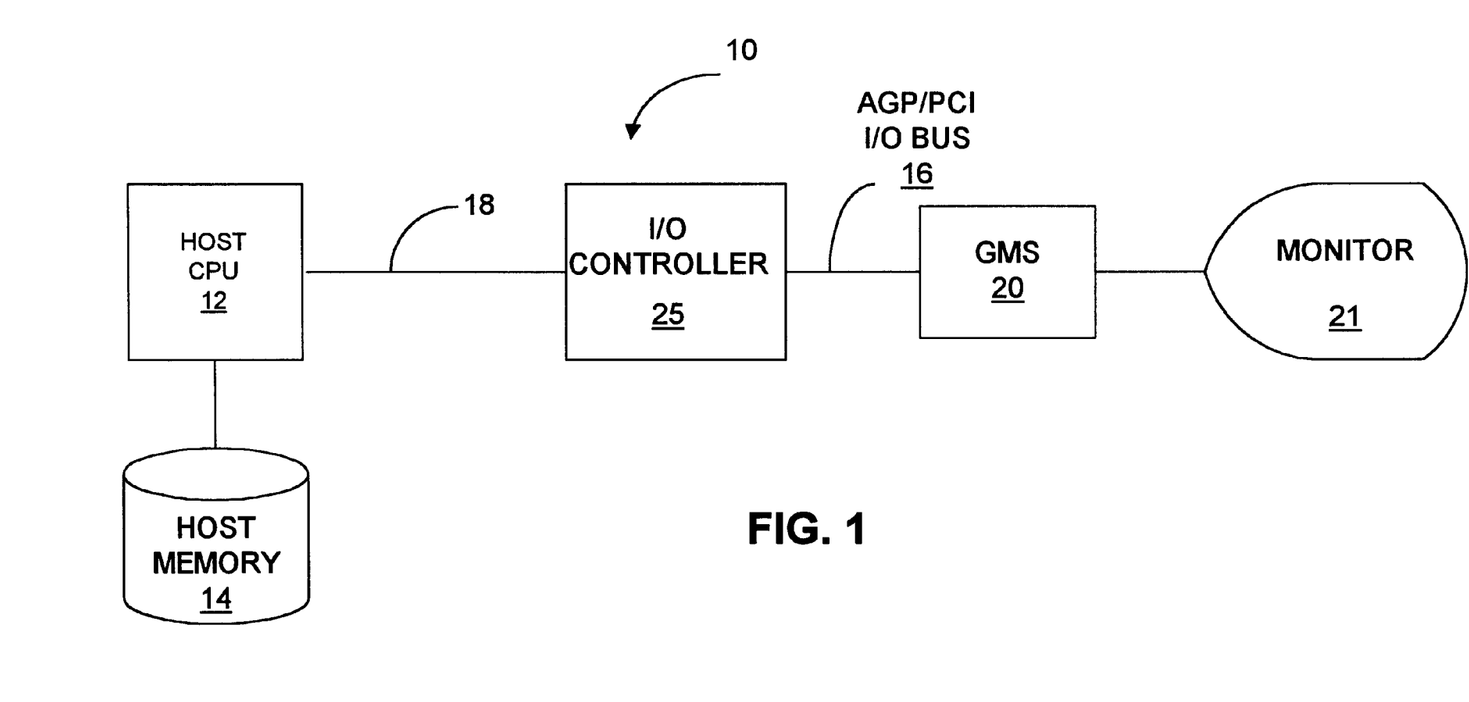
FIG. 1 is a block diagram of a computer graphics display system incorporating a graphics memory system which implements the method and apparatus of the present invention.

FIG. 1 is a block diagram of a computer graphics display system 10 which may incorporate the method and apparatus of the present invention. The computer graphics display system 10 comprises a host CPU 12, a main memory device 14, a local bus 18, an input/output (I/O) controller device 25, an accelerated graphics port/peripheral component interconnect (AGP/PCI) interface bus 16, a graphics memory system 20, and a monitor 21 for displaying graphics information output from the graphics memory system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the PCI/AGP interface bus 16. The information received over the PCI/AGP interface bus 16 is input to the graphics memory system (GMS) 20. The graphics memory system 20 then processes this information and causes graphics images to be displayed on the monitor 21.

Figure 2:
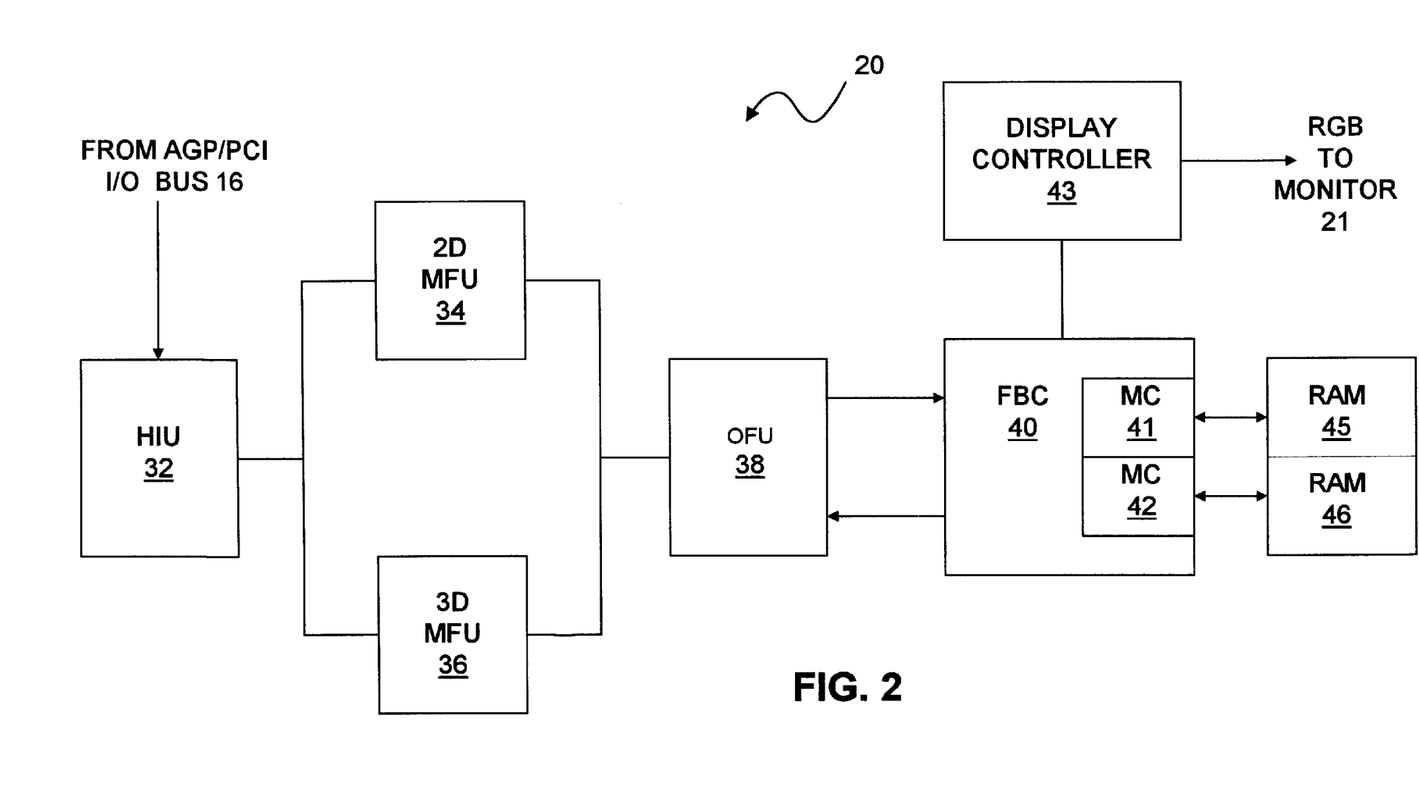
FIG. 2 is a block diagram of the graphics memory system shown in FIG. 1 in which the method and apparatus of the present invention may be implemented.

FIG. 2 is a block diagram of the graphics memory system 20 shown in FIG. 1. The method and apparatus of the present invention are implemented within the host interface unit 32. Before, discussing the method and apparatus of the present invention in detail, a general discussion of the host interface unit 32, which applies to both PCI and AGP specifications, will be provided. The host interface unit 32 fetches command data packets and texture maps from the host memory 14 via the PCI/AGP bus 16. The host interface unit 32 then provides graphics 2D information to the 2D macro-function unit 34 and 3D information to the 3D macro-function unit 36. The 2D macro-function unit 34 generates 2D vectors, text and rectangle spans. The 3D macro-function unit 36 performs triangle setup, 3D rastorization, and texture mapping.

The output from the 2D and 3D macro-function units 34 and 36 is received by the object function unit 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controllers (MC0 and MC1) 41 and 42 to cause the memory controllers 41 and 42 to write and read pixel colors and Z coordinates to and from RAM 45 and RAM 46. The frame buffer controller 40 also fetches display information which is sent to the display controller 43. The display controller 43 receives the display information and converts it into red, green and blue (RGB) analog data and sends it to the display monitor 21.

Figure 3:
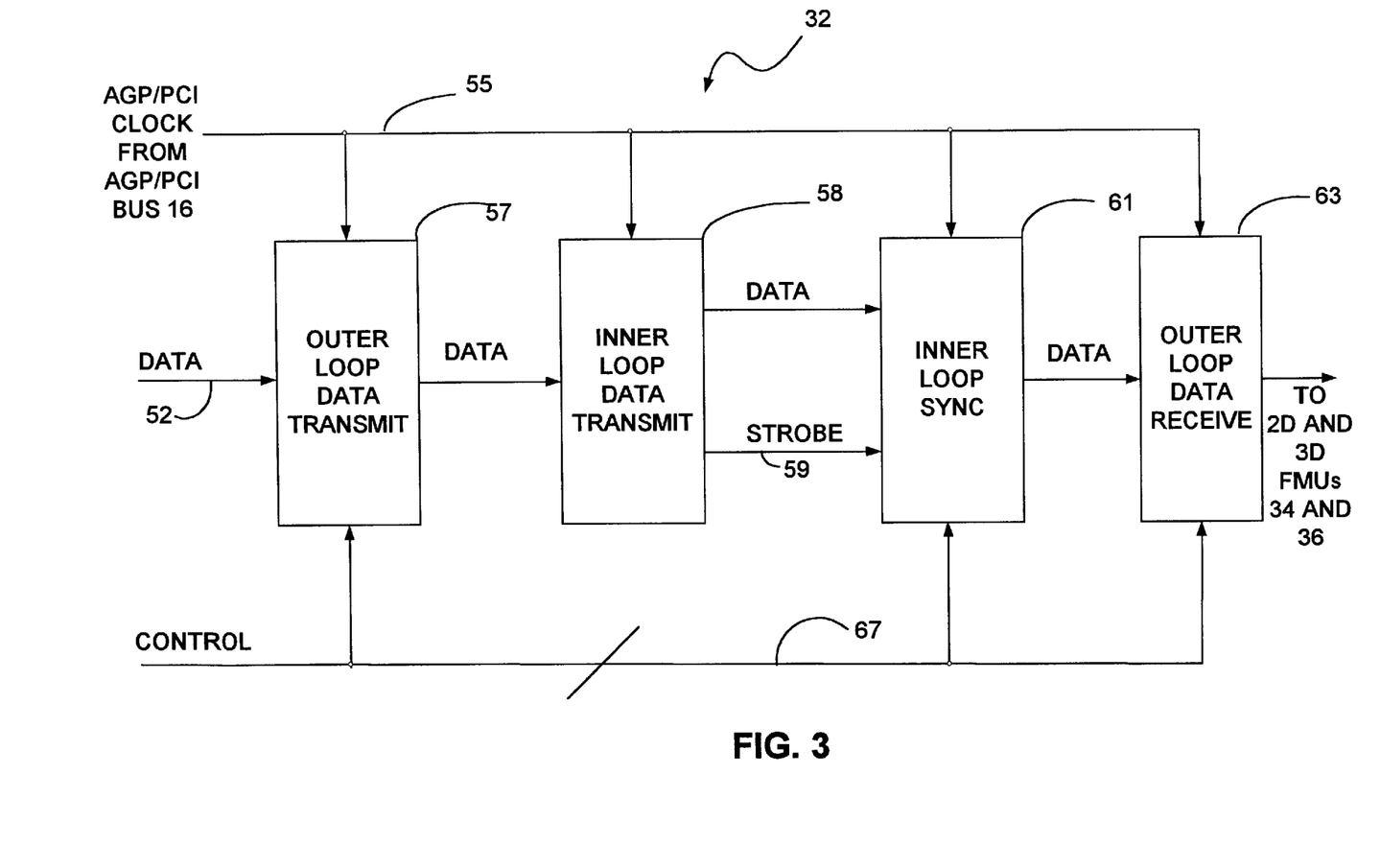
FIG. 3 is a block diagram of the host interface unit of the graphics memory system shown in FIG. 2, wherein the host interface unit incorporates the method and apparatus of the present invention.

FIG. 3 is a block diagram of the host interface unit 32 of the present invention in accordance with the preferred embodiment. The host interface unit 32 comprises an outer loop which comprises outer loop data transmit component 57 and outer loop data receive component 63. This outer loop section typically is present in any AGP host interface unit and is not unique to the present invention. The outer loop data transmit component 57 receives data on line 52, which is comprised by the AGP/PCI bus 16. The outer loop data transmit component 57 and the outer loop data receive component 63 also receive control signals on line 67, which is also comprised by the AGP/PCI bus 16. All of the components of the host interface unit 32 shown in FIG. 3 receive the AGP/PCI clock 55.

The outer loop data transmit component 57 transmits data to the inner loop data transmit component 58, at the AGP/PCI interface clock rate. The AGP/PCI clock 55 can be any frequency in the range of 33 MHz to 66 MHz. The inner loop data transmit component 58 generates the strobe from the AGP/PCI clock 55 and aligns the data on the rising and falling edges of the strobe signal 59 in accordance with the AGP specification. There are several circuits that are currently available on the market from various suppliers that are designed for and capable of performing this task. Therefore, in the interest of brevity, a detailed discussion of the manner in which this task is accomplished will not be provided. It will be understood by those skilled in the art that the present invention is not limited to any particular manner for generating the strobe signal and for aligning the data on the rising and falling edges of the strobe signal.

The data and strobe are provided to the inner loop synchronization component 61. With data received on both edges of strobe, the rate of data received by the inner loop synchronization component 61 is twice the rate of the AGP/PCI clock 55. The inner loop data synchronization component 61 synchronizes the received data to the AGP/PCI clock 55. This synchronized data is then output to the outer loop data receive component 63.

The outer loop data transmit component 57 and the inner loop data transmit component typically are implemented in a separate integrated circuit for the inner loop synchronization component 61 and outer loop data receive component 63. Therefore, the AGP interface allows data to be transmitted at twice the PCI data rate between the different system components.

The data is provided to the inner loop synchronization component 61 of the present invention on the rising and falling edges of the strobe. The rate of the strobed data is twice the rate of the AGP/PCI clock 55. The inner loop synchronization component 61 receives the strobed data and re-aligns, or synchronizes, the data to the AGP/PCI clock. The re-aligned data is then output to the outer loop data receive component 63. The outer loop data receive component 63 then performs whatever task it is commanded to perform with the data in accordance with information transmitted to the outer loop data receive component 63 via control lines 67. The data is output from the outer loop data receive component 63 to the 2D or 3D FMUs 34 and 36. The information delivered on the control lines 67 to the outer loop components 57 and 63 is not transmitted through the inner loop comprised of inner loop components 58 and 61.

Figure 4:
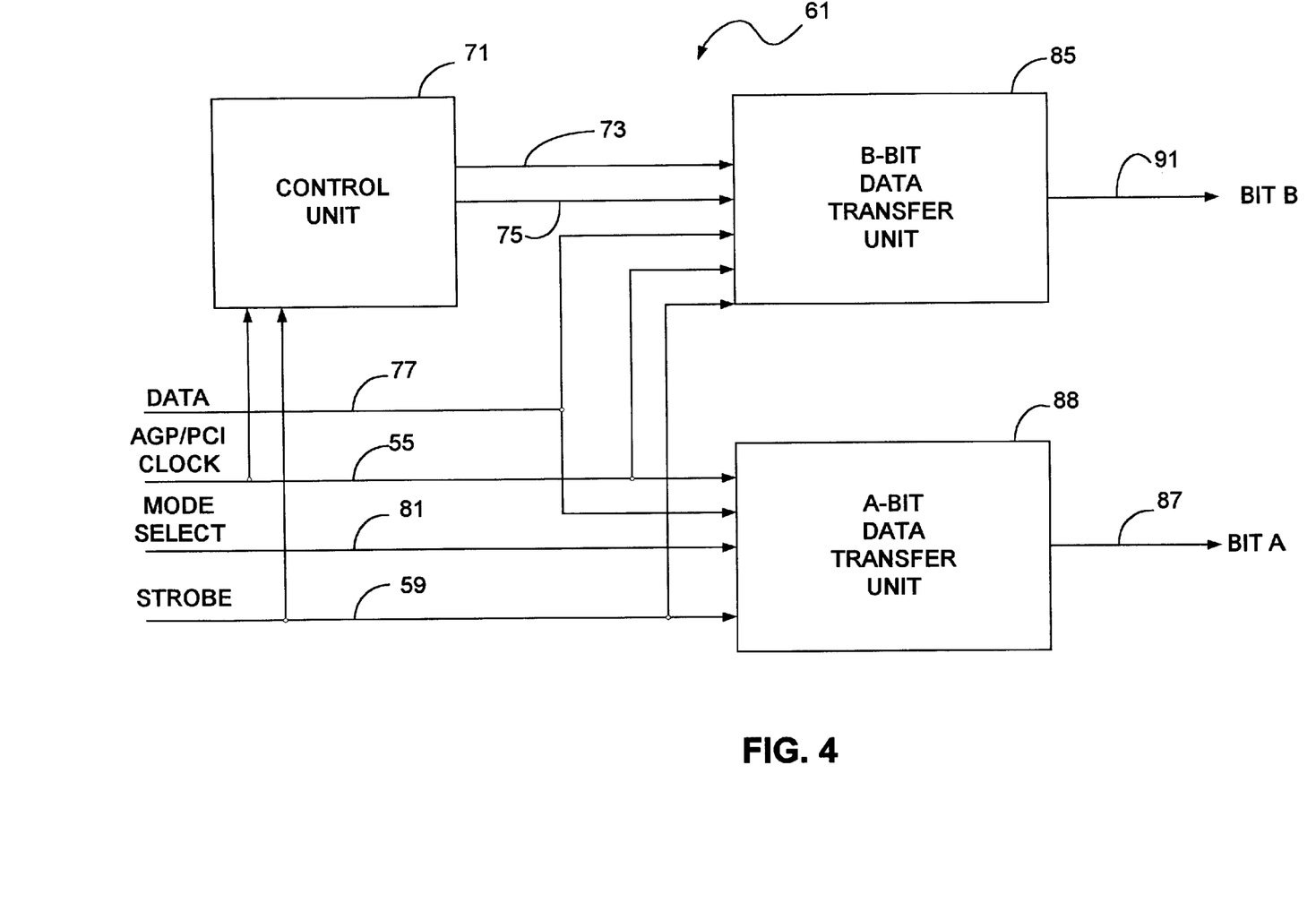
FIG. 4 is a block diagram of an inner loop synchronization component of the host interface unit shown in FIG. 3.

FIG. 4 is a block diagram of the inner loop synchronization component 61 of the present invention. The inner loop synchronization unit 61 receives the strobe signal 59, the data signal 77, which is aligned on the rising and falling edges of the strobe signal 59, the AGP/PCI clock signal 55 and a mode select signal 81. The mode select signal 81 is delivered to the inner loop synchronization component 61 via control lines 67. The host interface unit 32 of the present invention is capable of being used in the conventional PCI mode or in the AGP mode. In the conventional PCI mode, the data is transmitted within the inner loop of the host interface unit 32 comprised by components 58 and 61 at a frequency ranging from 33 MHz to 66 MHz. In the AGP mode, the data is transmitted on the rising and falling edges of the strobe 59 in the manner discussed above with respect to FIG. 3. The mode select signal 81 causes the inner loop synchronization component to operate in either the AGP mode or the PCI mode. The mode select signal is discussed below in more detail.

To provide an understanding of the present invention, it will be discussed with respect to two bits of data, namely bit A and bit B. Bit A is delivered from the inner loop data transmit component 58 to the inner loop synchronization component 61 on the falling edge of strobe 59 and bit B is delivered from the inner loop data transmit component 58 to the inner loop synchronization component 61 on the rising edge of strobe 59. The control unit 71 comprises timing circuitry for generating capture 73 and select 75 signals, both of which are delivered to the B-bit data transfer unit 85. The B-bit data transfer unit 85 captures bit B by utilizing the capture signal 73 and the select signal 75 in conjunction with the logic circuitry contained in the B-bit data transfer unit 85. The manner in which this logic is configured in accordance with the preferred embodiment of the present invention is discussed below in more detail. However, persons skilled in the art will understand that the present invention is not limited to the particular logic configuration discussed herein for re-aligning, or synchronizing, the data with the AGP/PCI clock 55.

The A-bit data transfer unit 88 is responsible for capturing bit A. The bit-A data transfer unit 88 preferably comprises a series of pipe stages which delay bit A until bit B has been captured by the bit-B data transfer unit 85. Bits A and B will become available on lines 87 and 91, respectively, at the start of a AGP/PCI clock cycle. Therefore, the inner loop synchronization component 61 of the present invention comprises logic for capturing bits aligned on the rising and falling edges of a strobe, wherein the AGP/PCI clock cycle of the falling strobe edge is known whereas the cycle of the rising edge is unknown, and re-aligning the bits so that they are available for transmission at the AGP/PCI clock rate.

Figure 5:
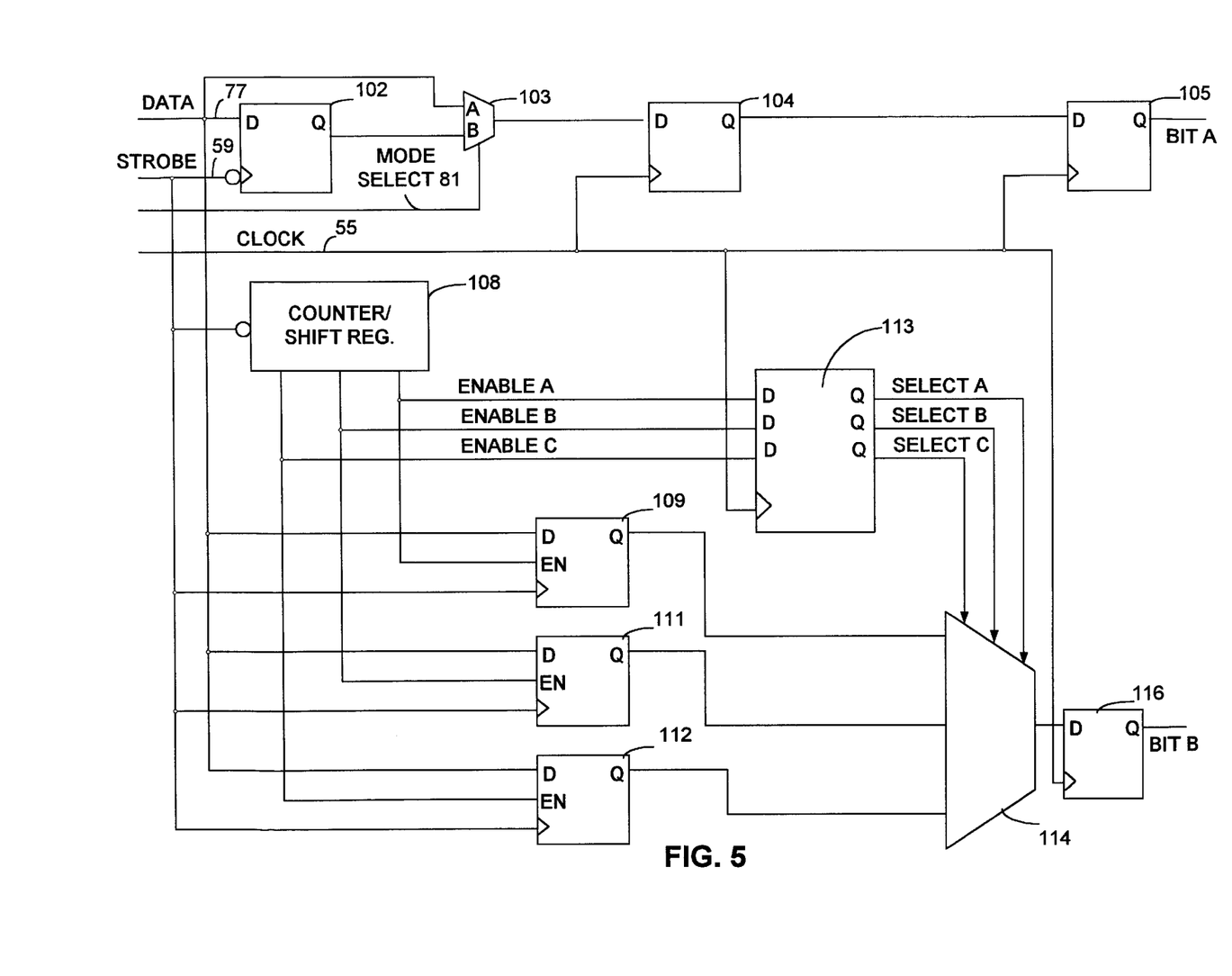
FIG. 5 is a schematic block diagram of the inner loop synchronization component of the host interface unit shown in FIG. 3 in accordance with the preferred embodiment of the present invention.

FIG. 5 is a schematic block diagram of the inner loop synchronization component 61 of the present invention in accordance with the preferred embodiment. While discussing the block diagram of FIG. 5, reference will be made to the timing diagram of FIG. 6 in order to demonstrate the timing aspects of the inner loop synchronization component 61.

The bit-A data transfer unit 88 shown in FIG. 4 is represented by elements 102, 104 and 105 shown in FIG. 5. The bit-B data transfer unit 85 shown in FIG. 4 is represented by elements 109, 111, 112, 114 and 116 shown in FIG. 5. The control unit 71 shown in FIG. 4 is represented by elements 108 and 113 shown in FIG. 5. Bit A is transmitted to the inner loop synchronization unit 61 on the falling edge of the strobe 59. Bit B is transmitted to the inner loop synchronization unit 61 on the rising edge of the strobe 59.

Although the timing of the falling edge of the strobe 59 is known, the rising edge of the strobe may occur within the same AGP/PCI clock cycle in which the falling edge occurred, or it may occur in the next succeeding AGP/PCI clock cycle. During a first AGP/PCI clock cycle, T1, bit A (D1 in the timing diagram) is presented to the inner loop synchronization component 61. On the falling edge of the strobe 59, bit A is latched into register 102. Bit A is synchronized to the AGP/PCI clock 55 via register 104. On the next AGP/PCI clock pulse, during a second AGP/PCI clock cycle, T2, bit A will be available at the Q output of register 104. Bit A will be presented at the Q output of register 105 on the next clock pulse, during a third AGP/PCI clock cycle, T3, two clock cycles after bit A was first presented to register 102 of the inner loop synchronization component 61.

It is not known whether bit B will be clocked during cycle T1 or during cycle T2. To account for this uncertainty, multiple registers are used to capture bit B. Preferably, three registers are used for this purpose. Therefore, in accordance with the preferred embodiment of the present invention, the data is captured sequentially in different registers, namely, registers 109, 111 and 112. The counter/shift register 108 controls which of registers 109, 111 or 112 will be enabled and, therefore, which of the registers 109, 111 or 112 will capture the next data. The strobe 59 is received at an inverting terminal of the counter/shift register 108, as shown. Therefore, counter/shift register 108 is only incremented on the falling edge of the strobe 59. Each time the counter/shift register 108 is incremented, a different register will be enabled. The counter/shift register 108 will only enable one of the registers 109, 111 or 112 at any one time.

The outputs of the counter/shift register 108 are also provided to register 113 and are used by register 113 to generate select signals, Select A, Select B and Select C, which are supplied to a multiplexer 114 to cause multiplexer 114 to select the output of one of the registers 109, 111 or 112. The output of the selected register is then supplied via multiplexer 114 to register 116.

When any one of the registers 109, 111 or 112 is enabled by the counter/shift register 108, data will be latched into that register on the rising edge of the strobe 59. When one of the registers 109, 111 or 112 is being loaded with data, the previously loaded register is being selected by multiplexer 114. The data from the selected register is then output to register 116. For example, if the registers are loaded in sequence with register 109 being loaded first, register 112 being loaded second, and register 112 being loaded third, then register 109 will be read as register 111 is being loaded, register 111 will be read as register 109 is being loaded, and register 112 will be read as register 111 is being loaded. However, it will be understood by those skilled in the art that the present invention is not limited to any particular sequence for reading and writing registers 109, 111 and 112.

Figure 6:
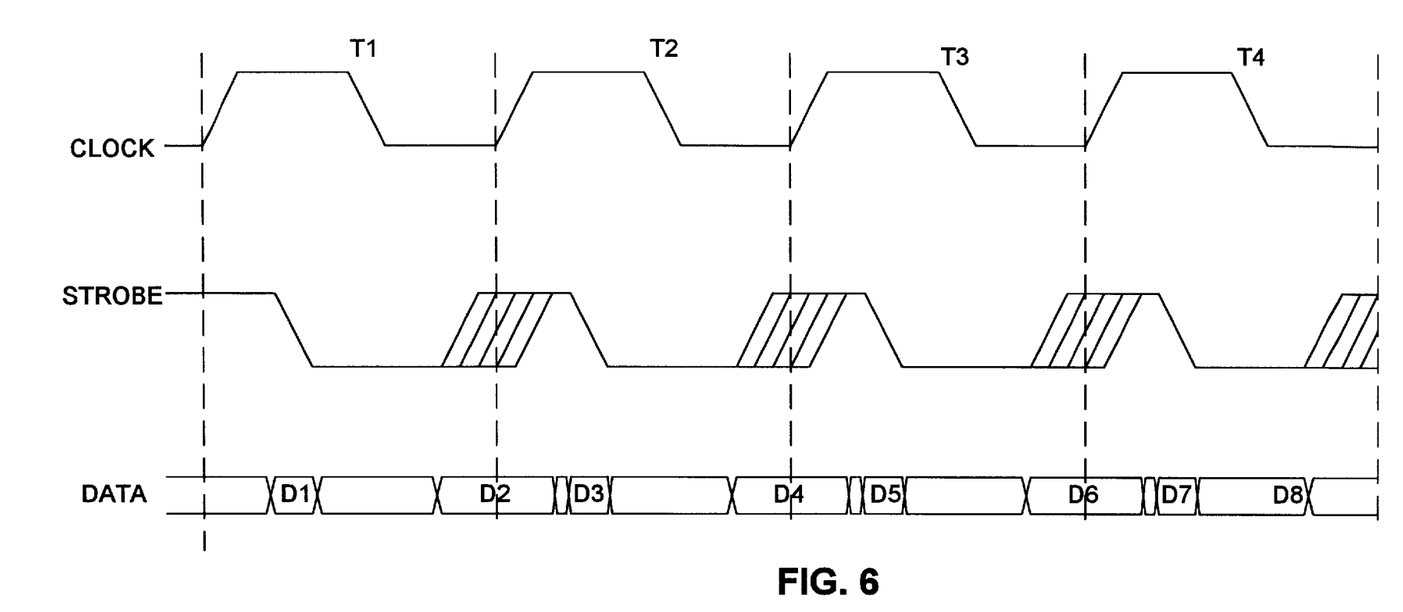
FIG. 6 is a timing diagram demonstrating the timing characteristics of the inner loop synchronization component shown in FIG. 5.

During AGP/PCI clock cycle T1, on the falling edge of the strobe 59, Enable A is asserted and Enables B and C are de-asserted, thus enabling register 109 to capture the incoming data at the D input of register 109 when the rising edge of strobe 59 occurs. The rising edge of strobe 59 can occur in cycle T1 or in cycle T2. Register 109 will capture bit B (D2 in the timing diagram) on the rising edge of the strobe 59. During cycle T2, Select A becomes asserted and Selects B and C become de-asserted, thus causing the Q output of register 109 to be sent to the input of register 116. Therefore, before T2 is finished, bit B (D2 in the timing diagram) will have been captured by register 109 and presented at the input of register 116.

During AGP/PCI clock cycle T2, the next bit A (D3 in the timing diagram) is captured at register 102 on the falling edge of the strobe 59. The falling edge of the strobe 59 causes the counter/shift register 108 to be incremented so that register 111 is enabled by Enable B while Enables A and C are de-asserted. Therefore, register 111 is loaded with bit B (D4 in the timing diagram) during either AGP/PCI clock cycle T2 or T3 on the rising edge of the strobe 59. On the rising edge of the AGP/PCI clock 55, during cycle T3, bit B (D2 in the timing diagram) will be output from register 116. Therefore, bit B has been delayed one or two cycles, depending on when the rising edge of strobe 59 occurred, and presented at the output of register 116 at the same time that bit A is presented at the output of register 105. It should be noted that regardless of whether the rising edge of strobe 59 occurs in the same AGP/PCI clock cycle in which the falling edge of strobe 59 occurred, bit B will be presented on line 91 at the same time that bit A is presented on line 87, which will be two AGP/PCI clock states after bit A (D1 in the timing diagram) was presented to register 102.

Bit A that was loaded into register 102 on the falling edge of strobe 59 during AGP/PCI clock cycle T2 (D3 in the timing diagram) will be output from register 105 to the AGP/PCI clock pulse occurring during cycle T4. On the falling edge of strobe 59 occurring during cycle T2, Enable B will be asserted and Enables A and C will be de-asserted when the counter/shift register 108 is incremented. Therefore, on the rising edge of the strobe 59 occurring during either cycle T2 or T3, bit B (D4 in the timing diagram) will be loaded into register 111. On the clock pulse occurring during cycle T2, bit B (D2 in the timing diagram) stored in register 109 will be selected by multiplexer 114 and sent to the input of register 116. On the clock pulse occurring during cycle T3, bit B (D2 in the timing diagram) will be shifted out of register 116 at the same time that bit A (D1 in the timing diagram) is shifted out of register 105.

On the falling edge of the strobe occurring during cycle T3, Enable C will be asserted and Enables A and B will be de-asserted when the counter/shift register 108 is incremented. Therefore, on the rising edge of the strobe 59 occurring during either cycle T3 or T4, bit B (D6 in the timing diagram) will be loaded into register 112. On the clock pulse occurring during cycle T3, bit B (D4 in the timing diagram) stored in register 111 will be selected by multiplexer 114 and sent to the input of register 116. On the clock pulse occurring during cycle T5, bit B (D4 in the timing diagram) will be shifted out of register 116 at the same time that bit A (D3 in the timing diagram) is shifted out of register 105.

On the falling edge of the strobe occurring during cycle T4, Enable A will be asserted and Enables B and C will be de-asserted when the counter/shift register 108 is incremented. Therefore, on the rising edge of the strobe 59 occurring during either cycle T4 or T5 (not shown), bit B (D8 in the timing diagram) will be loaded into register 109. On the clock pulse occurring during cycle T4, bit B (D6 in the timing diagram) stored in register 112 will be selected by multiplexer 114 and sent to the input of register 116. On the clock pulse occurring during cycle T6, bit B (D6 in the timing diagram) will be shifted out of register 116 at the same time that bit A (D5 in the timing diagram) is shifted out of register 105.

As stated above, the host interface unit 32 can be used in the conventional PCI mode rather than in the AGP mode if so desired. This feature of the present invention allows the host interface unit 32 to be used in conjunction with hardware which supports PCI, but which does not support AGP. In accordance with this embodiment of the present invention, the mode select signal 81 selects between inputs A and B of a multiplexer 103. In accordance with the AGP specification, when PCI mode is selected the strobe will be held in a high state. The select and enable signals will reside in the reset state and data received by bit B will not be used in the outer loop data receive component 63. When input A of the multiplexer 103 is selected, bit A is simply shifted through registers 104 and 105 in accordance with the AGP/PCI clock 55.

The sequence of the synchronization process discussed above will be repeated as long as the strobe signal continues to occur. The timing diagram of FIG. 6 demonstrates the relationship between the enable signals generated by the counter/shift register 108 and the select signals generated by register 113. Register 113 contains logic for generating the select signals in response to the enable signals received from the counter/shift register 108. However, the logic implemented in these components will not be discussed in detail because persons skilled in the art will understand how logic can be configured to properly generate the enable and select signals in view of the discussion of FIGS. 5 and 6. It will be understood by those skilled in the art that a variety of logic designs are suitable for this purpose and that the present invention is not limited to any particular logic design.

Figure 7:
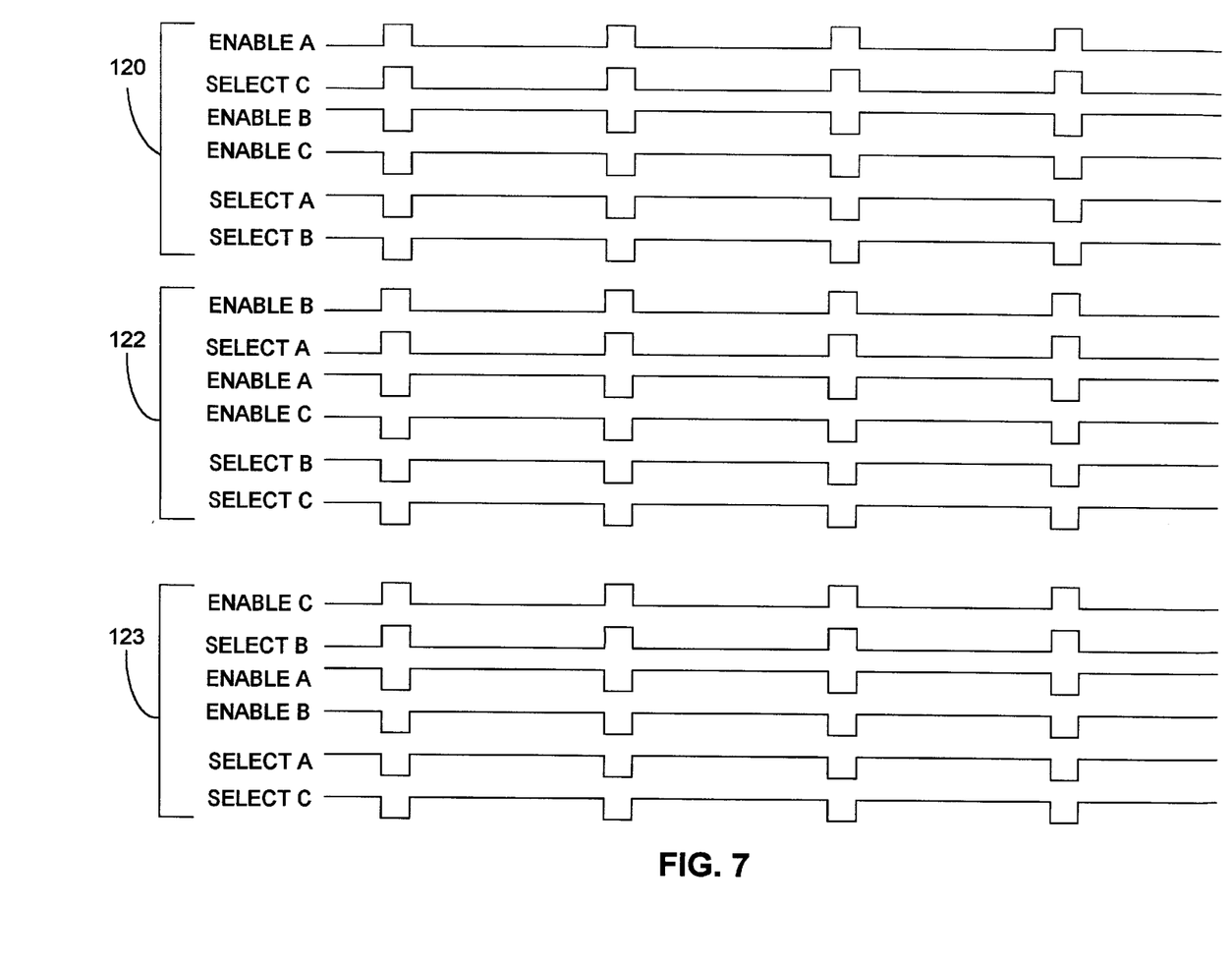
FIG. 7 is a timing diagram demonstrating the timing of the enable and select signals generated by the control unit of the inner loop synchronization component shown in FIG. 5.

FIG. 7 is a timing diagram demonstrating the timing of the enable and select signals shown in FIG. 5. When Enable A is asserted during the sequence identified by numeral 120, Select C will also be asserted. All of the other enable and select signals will be de-asserted, as indicated. Therefore, as long as Enable A is asserted, only register 109 can be loaded with bit B and only register 112 can be selected by multiplexer 114. Similarly, when Enable B is asserted during the sequence identified by numeral 122, Select A will also be asserted. During sequence 122, all of the other enable and select signals will be de-asserted, as indicated. Therefore, as long as Enable B is asserted, only register 111 can be loaded with bit B and only register 109 can be selected by multiplexer 114. When Enable C is asserted during the sequence identified by numeral 123, Select B will also be asserted. During sequence 123, all of the other enable and select signals will be de-asserted, as indicated. Therefore, as long as Enable C is asserted, only register 112 can be loaded with bit B and only register 111 can be selected by multiplexer 114. The register 113 generates the select signals at the Q outputs of register 113 on the rising edge of the AGP/PCI clock 55. However, since the enable signals supplied to register 113 will not change until the falling edge of strobe 59 occurs, the select signals at the Q outputs of register 113 also will not change until the falling edge of strobe 109 occurs.

It should be noted that the enable and select signals are shown in FIG. 7 as being high when they are asserted and as being low when they are de-asserted. It will be understood by those skilled in the art that the polarity of these signals can be reversed to indicate when these signals are being asserted and de-asserted. In the latter case, a low enable signal would enable the corresponding register and a low select signal would cause the corresponding register to be selected. Of course, the digital components utilizing these signals would need to be designed consistently with this logic.

It should be noted that the present invention has been described with respect to the preferred embodiments, but that the present invention is not limited to these embodiments. It will be understood by those skilled in the art that the present invention can be implemented in a variety of ways to achieve the results of the present invention discussed above with respect to the preferred embodiment. For example, although FIG. 5 illustrates a specific logical implementation for the inner loop synchronization unit 61, it will be understood by those skilled in the art that the present invention is not limited to the logic configuration shown in FIG. 5. It will be apparent to those skilled in the art, in view of the discussion provided herein, that many logic designs can be utilized to achieve the functionality achieved by the logic shown in FIG. 5. It will be understood by those skilled in the art that other variations and modifications to the embodiments discussed herein can be made without deviating from the spirit and scope of the present invention.

What is claimed is:

1. An inner loop synchronization component for receiving data transmitted to the inner loop synchronization component on the falling and leading edges of a strobe signal and for synchronizing the data with a clock signal, the clock signal having a clock cycle, the inner loop synchronization component comprising:

a first data transfer unit, the first data transfer unit comprising logic configured to capture the data transmitted on the falling edge of the strobe signal and logic configured to delay the captured data a predetermined number of cycles of the clock before outputting the captured data from the first data transfer unit;

a control unit, the control unit detecting the falling edge of the strobe signal and generating a timing signal that is derived from the strobe signal, wherein the timing signal is utilized by the inner loop synchronization component to capture the data transmitted on the rising edge of the strobe signal; and a second data transfer unit, the second data transfer unit comprising logic configured to capture the data transmitted on the rising edge of the strobe signal, the second data transfer unit receiving the timing signal generated by the control unit and utilizing the timing signal to capture the data transmitted on the rising edge of the strobe signal, the second data transfer unit comprising logic configured to delay the data captured by the second data transfer unit a predetermined number of cycles of the clock before outputting the captured data from the second data transfer unit.

2. The inner loop synchronization component of claim 1, wherein the data is being transmitted to the inner loop synchronization component in accordance with an accelerated graphics port (AGP) specification.

3. The inner loop synchronization component of claim 2, wherein the clock signal is generated in accordance with a peripheral control interconnect (PCI) specification.

4. The inner loop synchronization component of claim 3, wherein the inner loop synchronization component is implemented in a graphics memory system of a computer graphics display system.

5. The inner loop synchronization component of claim 4, wherein the data captured by the first data transfer unit is delayed two clock cycles before being output from the first data transfer unit, and wherein the data captured by the first data transfer unit is output from the first data transfer unit during the same clock cycle in which the data captured by the second data transfer unit is output from the second data transfer unit.

6. The inner loop synchronization component of claim 5, wherein the falling and rising edges of the strobe signal occur during a first clock cycle.

7. The inner loop synchronization component of claim 5, wherein the falling edge of the strobe signal occurs during a first clock cycle and the rising edge of the strobe signal occurs during a second clock cycle, wherein the first clock signal immediately precedes the second clock signal.

8. The inner loop synchronization component of claim 1, wherein the control unit generates a plurality of timing signals, the control unit comprising timing logic for generating the timing signals, the timing signals corresponding to a plurality of enable signals and a plurality of select signals, the timing logic utilizing the strobe signal to generate the enable signals and the select signals, and wherein the logic comprised by the second data transfer unit includes a plurality of data-capture registers for storing data transmitted to the inner loop synchronization component on the rising edges of the strobe signal, each of the enable signals enabling one of said data-capture registers, wherein when one of said data-capture registers is enabled, the other data-capture registers are disabled, wherein the enabled data-capture register captures the data transmitted on the rising edge of the strobe signal and temporarily stores the captured data, and wherein the stored data is unloaded when the data-capture register in which the data is stored receives one of said select signals.

9. The inner loop synchronization component of claim 8, wherein the logic comprised by the second data transfer unit includes an output register, wherein when the stored data is unloaded from the data-capture register, the unloaded data is stored in an output register, the output register receiving the clock signal, wherein the data stored in the output register is output therefrom when the clock signal is received by the output register.

10. The inner loop synchronization component of claim 9, wherein the data is being transmitted to the inner loop synchronization component in accordance with an accelerated graphics port (AGP) specification.

11. The inner loop synchronization component of claim 10, wherein the clock signal is generated in accordance with a peripheral control interconnect (PCI) specification.

12. The inner loop synchronization component of claim 11, wherein the inner loop synchronization component is implemented in a graphics memory system of a computer graphics display system.

13. The inner loop synchronization component of claim 12, wherein the data captured by the first data transfer unit is delayed two clock cycles before being output from the first data transfer unit, and wherein the data captured by the first data transfer unit is output from the first data transfer unit during the same clock cycle in which the data captured by the second data transfer unit is output from the output register of the second data transfer unit.

14. The inner loop synchronization component of claim 13, wherein the falling and rising edges of the strobe signal occur during a first clock cycle.

15. The inner loop synchronization component of claim 13, wherein the falling edge of the strobe signal occurs during a first clock cycle and the rising edge of the strobe signal occurs during a second clock cycle, wherein the first clock signal immediately precedes the second clock signal.

16. A method for synchronizing data with a clock signal, the clock signal having a clock cycle, wherein the data is being transmitted on the rising and falling edges of a strobe signal, the method comprising the steps of:

receiving data transmitted on the falling edge of a strobe signal and delaying the received data for a first predetermined delay period;

outputting the received data after the first predetermined delay period has ended;

detecting a rising edge of the strobe signal;

capturing the data transmitted on the detected rising edge of the strobe signal;

delaying the captured data for a second predetermined delay period; and outputting the captured data after the second predetermined delay period has ended, wherein the data that is output after the first and second delay periods have passed is synchronized with the clock signal.

17. The method of claim 16, wherein the first and second predetermined delay periods end simultaneously, the first delay period corresponding to a predetermined number of clock cycles, the second delay period corresponding to a predetermined number of clock cycles.

18. The method of claim 17, wherein the first and second delay periods correspond to an identical number of clock cycles.

19. The method of claim 17, wherein the first and second delay periods correspond to a different numbers of clock cycles.

20. The method of claim 16, wherein the received data is output two clock cycles after it is received and wherein the captured data is output during the same clock cycle in which the received data is output.

21. The method of claim 16, wherein the data is transmitted on the rising and falling edges of the strobe signal in accordance with an accelerated graphics port (AGP) specification and wherein the outputted data is synchronized with the clock in accordance with a peripheral control interconnect (PCI) specification.

22. The method of claim 21, wherein the step of capturing includes the step of storing the data transmitted on the rising edge of the strobe signal in a data-capture register when the rising edge of the strobe signal is detected.

23. The method of claim 22, wherein the data stored in the data-capture register is subsequently output to an output register where the output data is temporarily stored, wherein the data stored in the output register is output from the output register at the end of said second predetermined delay period.

* * * * *